(12) United States Patent
Struckhoff et al.

(10) Patent No.: US 11,150,350 B2
(45) Date of Patent: Oct. 19, 2021

(54) SYSTEMS AND METHODS FOR NORTHFINDING

(71) Applicant: ELBIT SYSTEMS OF AMERICA, LLC, Fort Worth, TX (US)

(72) Inventors: Andrew Struckhoff, Fort Worth, TX (US); Tom Hardy, Fort Worth, TX (US); Jason R. Lane, Fort Worth, TX (US); James Sarette, Fort Worth, TX (US); Darius Coakley, Fort Worth, TX (US)

(73) Assignee: ELBIT SYSTEMS OF AMERICA, LLC, Fort Worth, TX (US)

( * ) Notice: Subject to any disclaimer, the term of this patent is extended or adjusted under 35 U.S.C. 154(b) by 242 days.

(21) Appl. No.: 16/148,037

(22) Filed: Oct. 1, 2018

(65) Prior Publication Data

US 2019/0033457 A1 Jan. 31, 2019

Related U.S. Application Data

(63) Continuation of application No. 14/817,688, filed on Aug. 4, 2015, now Pat. No. 10,175,358.

(Continued)

(51) Int. Cl.
*G01S 17/46* (2006.01)
*G01C 17/34* (2006.01)
(Continued)

(52) U.S. Cl.
CPC ............ *G01S 17/46* (2013.01); *G01C 17/34* (2013.01); *G01C 21/005* (2013.01); *G01C 21/02* (2013.01);
(Continued)

(58) Field of Classification Search
CPC .... G01S 3/7867; G01S 7/4813; G01S 7/4814; G01S 7/4816; G01S 17/023; G01S 17/58;
(Continued)

(56) References Cited

U.S. PATENT DOCUMENTS 8,872,854 B1* 10/2014 Levitt .................. G06F 1/1686
345/633
2008/0163504 A1* 7/2008 Smith .................... G01C 21/20
33/268

(Continued)

FOREIGN PATENT DOCUMENTS

| WO | 2011140501 | 11/2011 |
| WO | 2014127142 | 8/2014 |
| WO | 2015108591 | 7/2015 |

OTHER PUBLICATIONS

Extended European Search Report for European Patent Application No. 16833869.7 dated Mar. 14, 2019.

*Primary Examiner* — Luke D Ratcliffe
(74) *Attorney, Agent, or Firm* — K&L Gates LLP (57) ABSTRACT

An apparatus for target location is disclosed. The apparatus includes a housing, which includes a range sensor to generate range data, an image sensor to generate image data, an inertial sensor to generate inertia data, and a processor. The processor is configured to receive the image data from the image sensor and determine a first orientation of the housing and receive the inertia data from the inertial sensor and modify the first orientation based on the inertia data to produce a modified orientation of the housing.

20 Claims, 5 Drawing Sheets

Related U.S. Application Data (60) Provisional application No. 62/032,724, filed on Aug. 4, 2014.

(51) Int. Cl.
  *G01S 17/08* (2006.01)
  *G01C 21/00* (2006.01)
  *G01C 21/02* (2006.01)
  *G01S 3/786* (2006.01)
  *G01S 17/86* (2020.01)

(52) U.S. Cl.
  CPC .............. *G01S 17/08* (2013.01); *G01S 17/86* (2020.01); *G01S 3/7861* (2013.01); *G01S 3/7867* (2013.01)

(58) Field of Classification Search
  CPC .......... G01S 17/87; G01S 17/88; G01S 17/89; G01S 17/933; G01S 7/003; G01S 17/46; G01S 17/86; G01S 17/08; G01S 3/7861; G01C 17/34; G01C 21/005; G01C 21/02; G01C 3/08
  See application file for complete search history.

(56) References Cited

U.S. PATENT DOCUMENTS

| | | |
|---|---|---|
| 2009/0177398 A1 | 7/2009 | Helenkii et al. |
| 2010/0283840 A1* | 11/2010 | Belenkii ................ G01C 21/02 348/61 |
| 2011/0018990 A1 | 1/2011 | Komoto et al. |
| 2012/0044476 A1 | 2/2012 | Earhart |
| 2012/0175496 A1 | 7/2012 | Vorovitchik |
| 2014/0022539 A1 | 1/2014 | France |
| 2016/0033272 A1 | 2/2016 | Struckhoff et al. |

\* cited by examiner

SYSTEMS AND METHODS FOR NORTHFINDING

CROSS-REFERENCE TO RELATED APPLICATIONS

This application is a continuation of U.S. patent application Ser. No. 14/817,688 filed Aug. 4, 2015 titled "Systems and Methods for Northfinding" which claims the benefit of U.S. provisional patent application Ser. No. 62/032,724 filed Aug. 4, 2014 and entitled "Systems and Methods for Northfinding," which is incorporated herein by reference in its entirety.

BACKGROUND

The need for increased accuracy of target location determination is an important performance requirement for handheld targeting systems. Previously, the digital magnetic compass (DMC) was the primary component within systems used to determine the bearing (i.e., an angular measurement in the horizontal direction) between the observer and the target. The determined bearing was combined with a range to target, and inclination (i.e., an angular measurement in the vertical direction) of the target, and a location of the observer to provide a three-dimensional (3D) location of the target on the earth. However, any errors in the determined 3D location of the target may result in collateral damage (e.g., in a military context) when the target is located near one or more non-threat targets, for example in cases of urban engagement.

The horizontal bearing with respect to north of the target ("target azimuth") is typically the largest contributor to an error in the determined 3D location of the target. DMCs are susceptible to large errors caused by variations in a local magnetic field, which may be caused by steel structures such as buildings or vehicles, nearby power lines, weapons, and even a tripod upon which a target location determination system is mounted. Azimuth errors of only 6 degrees result in target location errors of over 200 meters when the observer-to-target range is 2 kilometers.

BRIEF DESCRIPTION OF THE DRAWINGS

For a detailed description of exemplary embodiments of the disclosure, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Alternatives to the above-described azimuth determination, hereinafter referred to as "northfinding," include celestial northfinding and inertial northfinding. Celestial northfinding relies on image processing of an image of the sun or stars, combined with knowledge of the time of day and physical location of the targeting system, to determine the north direction and then applies this to determine a bearing to the target (toward which the targeting system is oriented). Inertial northfinding relies on high-precision gyroscopes or other inertial sensors to detect the rotation of the earth relative to the targeting system to determine the north direction and then applies this to determine a bearing to the target (toward which the targeting system is oriented). Although inertial northfinding systems are more accurate than those using a DMC, such inertial northfinding systems are very expensive and generally too large and unwieldy to be easily used in the field.

Figure 1:
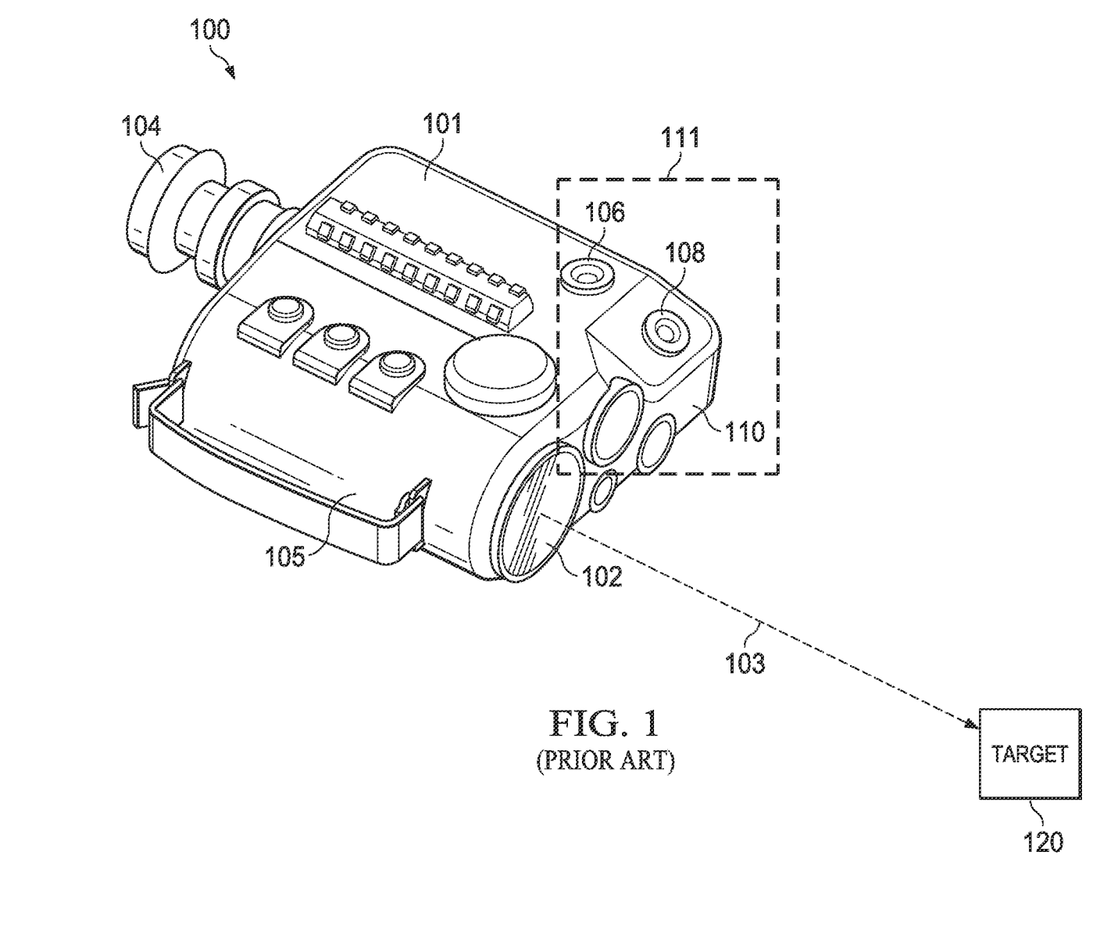
FIG. 1 shows a perspective diagram of a system for determining a location of a target.

Current celestial northfinding solutions utilize a separate imaging subsystem, which is integrated into an overall targeting system. FIG. 1 shows a prior art targeting system 100, which includes components for celestial northfinding. Targeting system 100 is embodied by a housing 101 that includes a rangefinder 102, which may be directed at the target 120 by orienting the line of sight 103 at the target 120. Operations of the targeting system 100 are generally carried out by a system processor 105. The housing 101 also includes a daytime image sensor 106 to capture an image of the sun when the system 100 is used during the day and a nighttime image sensor 108 to capture an image of the stars when the system 100 is used during the night. The daytime image sensor 106 may comprise a charge coupled device (CCD) and utilize wide angle or fisheye optics to that allows the image sensor 106 to observe a hemispherical view of the sky and ensure the sun is captured when the housing 101 is in a variety of orientations. The nighttime image sensor 108 may also comprise a CCD and utilize optics that provides a narrower (e.g., between a 25-degree and 35-degree) field of view of the night sky.

Inside the housing 101, an image capture processor 110 receives data from the aforementioned sensors 106, 108, in addition to data from a GPS subsystem (not shown), and/or other various subsystems. The daytime image sensor 106, nighttime image sensor 108, and the image capture processor 110 may be grouped together as a celestial northfinding module 111. The processor 110 may access a database including sun angle information and star map information for given times of day and locations on earth. As the user of the system 100 observes the target 120, the image sensors 106, 108 observe the sun or stars. Based on time of day and location of the system 100 (e.g., including its inclination, which may be subject to an inclinometer error), the information contained in the database is compared to the data provided by the sensors 106, 108 and the processor 110 determines an orientation of the system 100, which must then be corrected to determine a bearing of the target 120. The bearing is then provided to the system processor 105. Then, based on GPS data that indicates the position of the housing 101, the range to the target 120 given by rangefinder 102, and an inclination of the target 120, the system processor 105 determines a 3D location of the target 120. The inclination of the target 120 may be provided, for example, by an inclinometer. In some embodiments, the inclinometer is integrated to an existing DMC (not shown) inside the housing 101, which allows the DMC to generate data indicative of inclination of the housing 101. The resulting azimuth determination and 3D location of the target 120 is more accurate than when using a DMC alone.

However, the resulting targeting system 100 is expensive due to necessitating the inclusion of the celestial northfinding module 111 in addition to the system processor 105 and the optics already provided by the rangefinder 102 and digital display 104. The calibration and specialized optics required by the sensors 106, 108 can be prohibitive. For example, the optics of the celestial northfinding components of system 100 must be individually calibrated to remove effects of distortion in lenses of the image capture subsystem 106, 108 in order to achieve a required accuracy.

Production logistics and qualification of the overall system 100 also present problems. That is, such a targeting system 100 including the celestial northfinding module 111 is currently not produced in a way that allows the high production volume required of military systems. For example, current manufacturing methods require the housing 101 to be sent to a supplier of the celestial northfinding module 111 for integration and alignment. Additionally, suppliers have not qualified individual subsystems to the MIL-STD-810 qualification; rather, qualification is only provided at the system level.

Finally, the targeting system 100 including celestial northfinding components has practical disadvantages as well. During day-night crossover, illumination levels before sunrise and after sunset occlude stars from the nighttime image sensor 108, and thus no reference point is available to determine bearing to target 120. Similarly, in situations where top cover exists (e.g., clouds, foliage, or building obstacles), the upward facing sensors 106 and 108 cannot capture an image, and thus no reference point is available to determine bearing to target 120.

Figure 2:
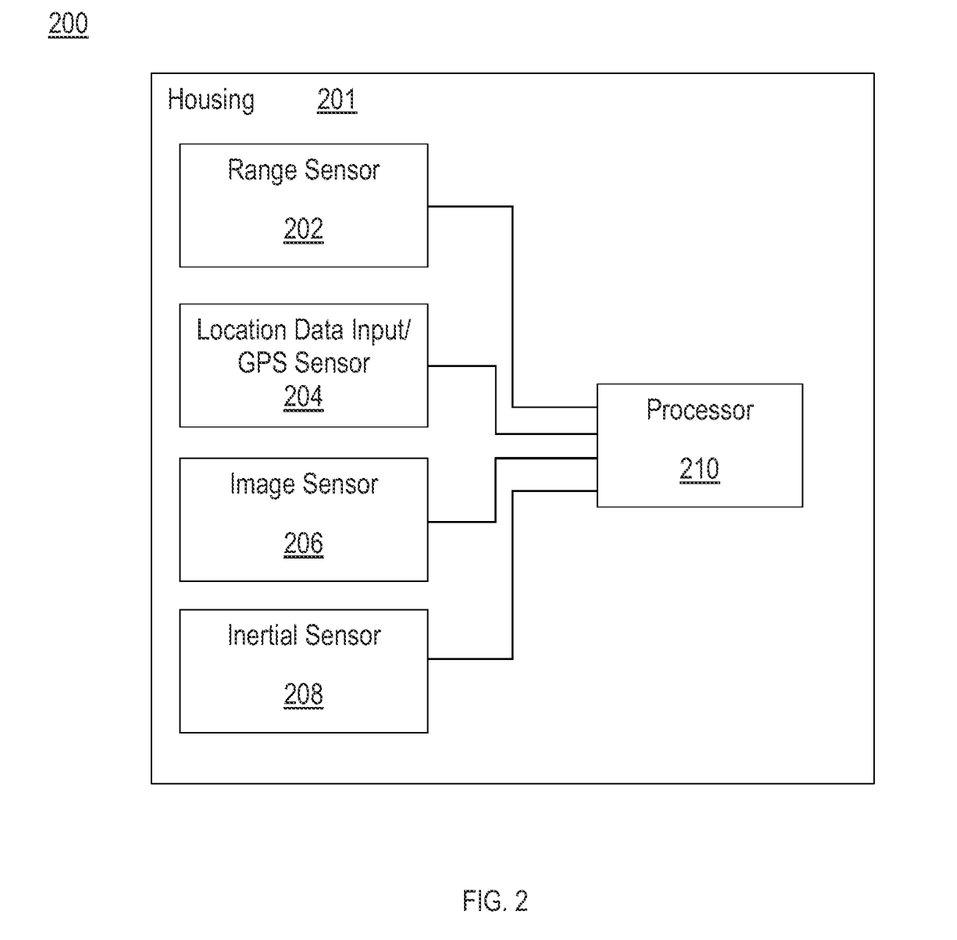
FIG. 2 shows a block diagram of a system for determining a location of a target in accordance with various examples.

To solve these and other problems, FIG. 2 shows a block diagram of a system 200 for target location in accordance with various examples of the present disclosure. The target location system 200 includes a housing 201, which contains a range sensor 202, an image sensor 206 for viewing targets and other objects, an inertial sensor 208, and a system processor 210. The target location system 200 also includes an input 204 for GPS or location data (which may also include data indicative of the time of day) that is coupled to and provided to the processor 210. In some embodiments, the location and/or time of day data may be generated by a GPS sensor internal to the housing 201 (in which case the input 204 comprises the GPS sensor), a GPS sensor external and coupled to the input 204 of the housing 201, or through manual entry of a location and/or time of day and date by way of an input device 204 such as a keypad, touchscreen, or the like. Unlike the system 100 shown in FIG. 1, target location system 200 does not require a separate celestial northfinding module 111 to capture images of celestial bodies. Although not depicted, the housing 201 may also include elements similar to those found in FIG. 1, such as a digital display, which is part of the optical system used to locate or view the target.

The range sensor 202 generates range data based on the distance to a target at which the housing 201 is directed. In some embodiments, the range sensor 202 is a laser rangefinder, a sonic transceiver, or other type of device to determine a distance to a target along a point of aim. The location data identifies a location of the housing 201. In embodiments where the location data is generated by a GPS sensor (either internal or external to housing 201), the GPS sensor may be one of many known types of such devices, and typically generates data that indicates at least a latitude value, a longitude value, and an elevation value of the housing 201 location (the 3D location of the housing 201). Further, an inclinometer may be integrated to a DMC (not shown) in the housing 201 to generate data related to the inclination of the target as explained above, which may be used to determine the height of the target relative to the housing 201. Additionally, in certain situations where GPS signals are not available, such as inside buildings, the location data of the housing 200 may be manually provided to the system processor 210 through an input device 204, which may be integrated to or coupled to the housing 200.

As explained above, in accordance with various examples, the image sensor 206 is integrated into an optical system used to view a target. The image sensor 206 may be, for example, a CMOS sensor, a CCD sensor, or other type of sensor to produce data indicative of a captured image. The optical system may consist of one or more lenses, a digital display, and also the range sensor 202. In this way, the optical system may be used to determine a distance to the target and also used to allow the image sensor 206 to capture an image, thereby generating image data. The inertial sensor 208 may include inertia-sensing devices such as an accelerometer, a gyroscope or, more particularly, a MEMS gyroscope, which may be attached to or otherwise contained in the housing 201. The inertial sensor 208 may comprise multiple individual sensors, for example arranged orthogonally to one another, or a single multi-axis sensor. The inertial sensor 208 generates inertia data, which may indicate an angular displacement or acceleration of the housing 201.

Figure 4:
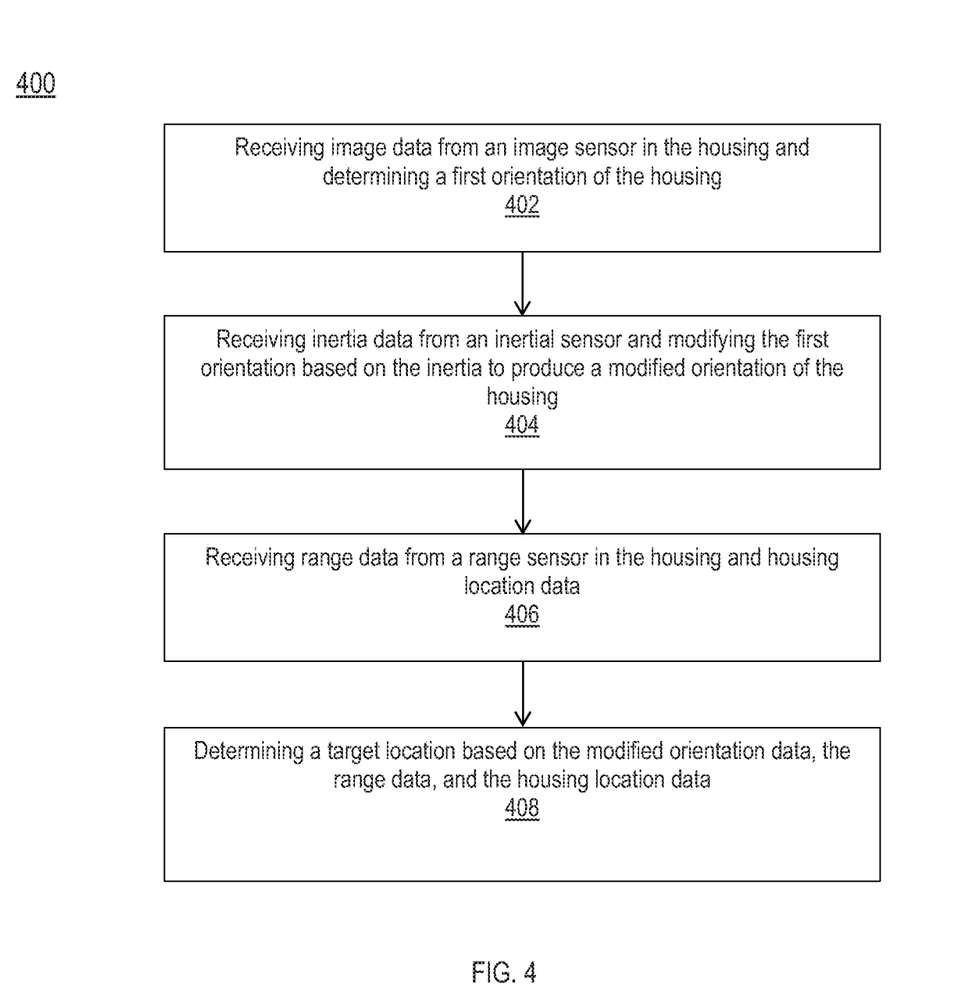
FIG. 4 shows a flow chart of a method for determining a location of a target in accordance with various examples.

The processor 210 receives data from each of the sensors or input devices 202, 204, 206, 208 and manipulates and/or processes this data to determine a 3D location of a desired target. In particular, the processor 210 receives image data from the image sensor 206, such as data generated when an image is captured of the sky. The image data may be data that is indicative of a celestial body, such as the sun, the moon, a star other than the sun, a grouping of stars other than the sun, or one or more planets. Based at least in part on the image data, the processor 210 determines a first orientation of the housing 201 (i.e., the orientation of the housing when the image was captured). The processor 210 may also utilize information about the location of the housing 201 (e.g., location and/or time of day data received from a GPS sensor) to determine the first orientation. For example, the processor 210 may access a database including sun and/or star position information for given times of day and locations on earth. When the user of the system 200 captures an image of a celestial body, the information contained in the database is compared to the time of day and location of the system 200 and the image data and the processor 210 determines the first orientation of the housing 201 based on these comparisons. FIG. 4, discussed further below, provide additional detail about example system s and methods of determining an orientation of the housing 201 by comparing a captured image with a database of known sun and/or star position information.

When the housing 201 is moved from the first orientation such that the housing 201 is now directed toward a target, the processor 210 receives inertia data from the inertia sensor 208 that indicates a change in angular position. Based on the received inertia data, the processor 210 modifies the first orientation to produce a modified orientation of the housing 201. For example, if processor 210 determined that the first orientation of the housing 201 was due north and the inertia data indicated that the housing 201 had rotated 90 degrees to the right, the processor 210 would produce a modified orientation of due east. In cases where the housing 201 is directed at the target in the modified orientation, the modified orientation also indicates the bearing of the target relative to the housing 201.

Once a bearing to the target is determined by the processor 210, range data from the range sensor 202 and location data 204 from a GPS sensor or other input device are received by the processor 210. As above, based on a known location of the housing 201, a bearing to the target, a distance to the target, and an inclination of the target, the processor 210 determines a 3D location of the target. In certain embodiments where a GPS device is included in or coupled to the housing 201, the GPS device may carry out portions of the above-described functionality ascribed to the processor 210. In any of the above scenarios, a non-transitory computer-readable medium may contain a set of instructions, which are executable by the processor 210, to cause the processor 210 to perform the functionality described herein. Such a computer-readable medium is within the scope of the present disclosure.

Thus, in accordance with various examples, rather than have a separate camera to observe the sun in order to find the target bearing, the user of the system 200 may simply point the system at the sun and cause the image sensor 206 to capture an image. Similarly, at night, the user simply points the system 200 at the stars and causes the image sensor 206 to capture an image. Because there are no separate cameras required, the cost and complexity of the system 200 are reduced. Once the direction of the sun or stars is determined by the system 200, the user returns the line of sight to the target. During this line of sight transition from the celestial object(s) to the target, the inertial sensor 208, which may be already integrated in the system 200, is used to track the motion and, in essence, "transfer" the bearing to the target. As an example, certain DMC systems may have additional gyroscope capabilities, which are leveraged as the inertial sensor 208 to produce inertial data.

As a result, if the user is under cover but can find any line of sight to the sky, the processor 210 of the system 200 is able to accurately determine the first orientation and subsequently "transfer" this orientation to determine a bearing to the target. Additionally, during day-night crossover, the sun may be used as a basis for determining the first orientation even as it dips below the horizon, whereas in the system shown in FIG. 1, it is difficult or impossible to design an upward facing camera with sufficient field of view to accurately detect the sun in such a position. Further, even in situations where the sky may not be viewable (e.g., in the case of intense cloud cover), if a body such as a landmark having a known location is viewable, image data of the body having a known location may be similarly used by the processor 210 to determine a first orientation of the housing 201.

Figure 3:
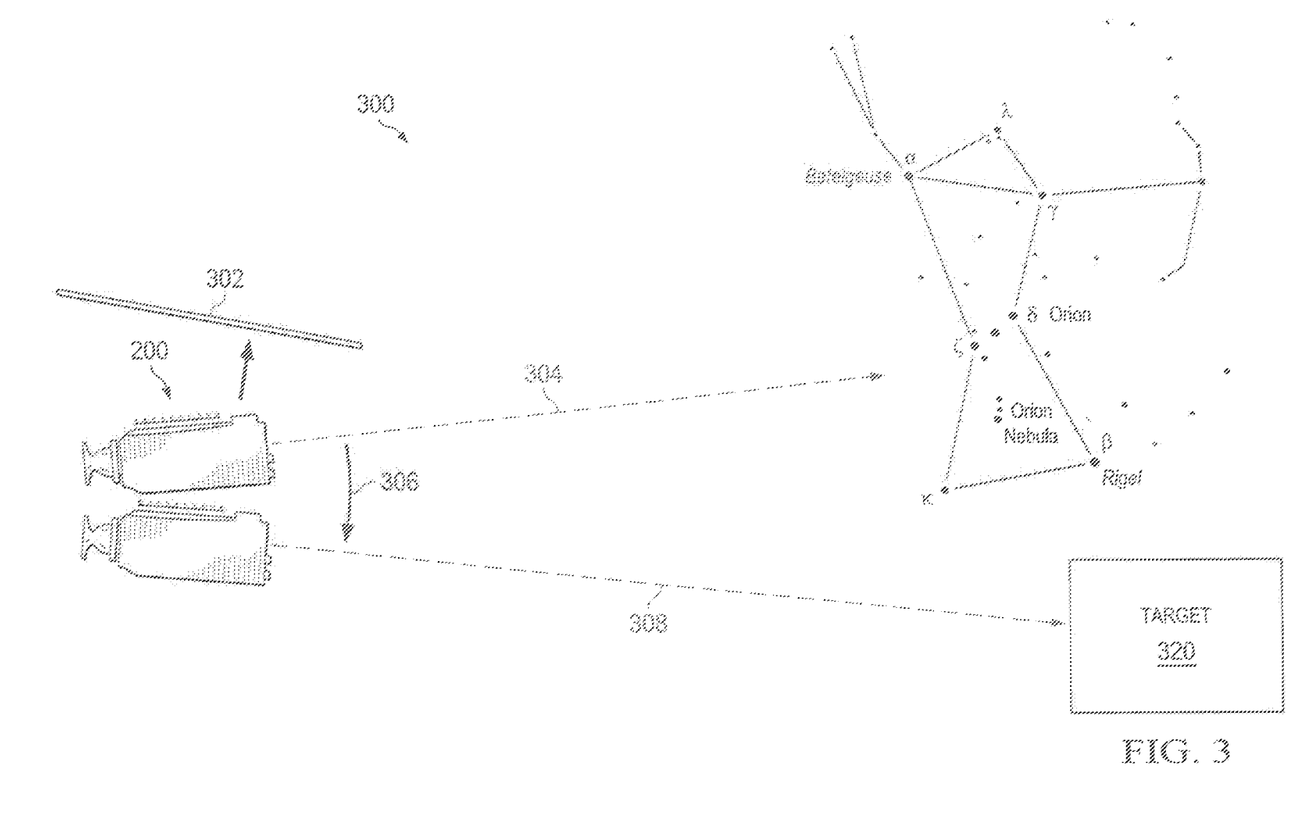
FIG. 3 shows an example of use of a system for determining a location of a target in accordance with various examples

FIG. 3 shows an example 300 of the use of target location system 200. FIG. 3 illustrates a situation in which a user of the target location system 200 is under cover 302, and thus the ability to view the sky by the conventional upward-looking celestial northfinding module 111 is impeded. However, in accordance with various examples, if the user is able to direct the target location system's image sensor 206 toward the sky (e.g., through a window, around a tree, or away from partial cloud cover) as shown by arrow 304, the processor 210 of the target location system 200 is still able to determine a first orientation of the system 200. Then, the user of the target location system 200 adjusts the system 200, as shown by arrow 306, such that its line of sight is directed at a target 320, as shown by arrow 308. During the motion 306, the processor 210 utilizes data from the inertial sensor 208 to track the amount and degree of motion to modify the determined first orientation to produce a modified orientation of the system 200. Based on the modified orientation, the distance to the target provided by the range sensor 202, the location of the system 200 provided by the GPS sensor or other input device, and the inclination of the target, the processor 210 is able to determine a 3D location of the target.

Turning now to FIG. 4, a method 400 for target location using a portable housing, such as housing 201, is shown in accordance with various examples of the present disclosure. The method 400 begins in block 402 with receiving image data from an image sensor in the housing and determining a first orientation of the housing. As explained above, the image sensor 206 may be integrated into an optical system used to view a target and captures an image of the sky. This image data may be indicative of a celestial body, such as the sun, the moon, a star other than the sun, or a grouping of stars other than the sun. As will be explained in further detail below, the first orientation of the housing may be determined based on the location of the celestial body in the captured image and calculation or comparison that utilizes known locations of celestial bodies as a function of time.

For example, settings of the image sensor and other associated image capture devices (e.g., optics) are adjusted to provide suitable image capture in the particular environment. The user also may be prompted to direct the housing or device toward the sun. The user may provide an input, such as pressing or activating a button, to indicate that the housing is directed at the sun, or at least the sun is within the scene to be captured by the image sensor. The image is acquired and the image data is provided by the image sensor to a processor in the housing. The processor may apply an image processing technique to determine the center of the sun in the scene, which will be explained in further detail below.

As another example where the housing is used at night-time when the sun is not present, the center of an image of celestial bodies such as stars is determined from the captured scene. In these cases, a stellar pattern-matching technique may be applied to determine the orientation of the housing (e.g., including its elevation and azimuth) based on the captured celestial bodies. In these examples, the determination may first include extracting the stars from the scene and creating a table of star positions in the system field of view.

This table of star positions in the system field of view is compared to tables of known star patterns. This determines which particular patch of stars is being observed.

In both day and night scenarios, the position of celestial bodies (relative to the earth) is determined through a series of known equations. The direction that the housing is pointed in terms of earth direction (i.e., bearing and inclination) is determined by combining this information with the time and known location of the device. As will be explained in further detail below, additional processing may be applied in accordance with certain embodiments of the present disclosure to better extract the object of interest (e.g., sun or stars) from clutter introduced by a real world environment.

The method 400 continues in block 404 with receiving inertia data from an inertial sensor and modifying the first orientation based on the inertia to produce a modified orientation of the housing. In some embodiments, the inertial sensor may be a gyroscope such as a MEMS gyroscope that generates data indicative of an angular displacement or acceleration of the housing from the first orientation to a second orientation. For example, the user may direct the line of sight or direction of the housing back to a target. In some cases, a prompt may be provided to the user to indicate the appropriate time to change the direction of the housing back to the target. Thus, the angular displacement or rotation may be "applied to" (i.e., used to alter) the first orientation to produce the modified orientation of the housing. For example, if the first orientation of the housing was due north and the inertia data indicated that the housing had rotated 90 degrees to the right, the modified orientation would be due east. In cases where the housing is directed at the target in the modified orientation, the modified orientation also indicates the bearing of the target relative to the housing. As a result, the inertial data is, in effect, used to "transfer" the first orientation or bearing to a target that the housing is directed toward in the modified or second orientation. In some examples, the modified orientation data may also incorporate an inclination of the target, for example based on an integrated inclinometer or a change in inclination—indicated by the inertial data—relative to the first orientation. In some cases, the determination of the centroid of the sun, the determination of the first orientation, and the determination of displacement based on inertial data may be performed approximately in parallel, although this need not be the case.

The method 400 continues in block 406 with receiving range data from a range sensor in the housing and housing location data. The range data may be provided by a laser rangefinder or other such device to determine range to a target. As explained above, the housing location data may be from a GPS sensor internal to the housing, external and coupled to the housing, manually entered by a user input device, or other similar ways to acquire data indicative of the location of the housing. Based on the modified orientation data, the range data, and the housing location data, the method 400 then continues in block 408 with determining the target's location. As above, based on a known location of the housing 201, a bearing to the target, a distance to the target, and an inclination of the target, the processor 210 determines a 3D location of the target.

As a result, if a user is under cover but can find any line of sight to the sky, the method 400 is able to accurately determine the first orientation toward a celestial body and subsequently "transfer" this orientation to determine a bearing to the target. Additionally, during day-night crossover, the sun may be used as a basis for determining the first orientation even as it dips below the horizon, whereas in the system shown in FIG. 1, it is difficult or impossible to design an upward facing camera with sufficient field of view to accurately detect the sun in such a position. Further, even in situations where the sky may not be viewable (e.g., in the case of intense cloud cover), if a body such as a landmark having a known location is viewable, image data of the body having a known location may be similarly used to determine the first orientation of the housing.

Further, in certain examples of the present disclosure, although not explicitly shown in the method 400, the method 400 may include first directing the housing at the desired target, then to a celestial or other body having a known location, and then back to the desired target. As above, inertial data is generated when moving the housing to different orientations. However, due to the increased number of data points or measurements taken, a potential to reduce error in the inertial calculations is provided. For example, if during one of the motions a maximum rate for the gyroscope is exceeded, the two readings may be significantly different and a user is prompted to correct the error (e.g., by re-performing the motion). In another example, the inertial data may be averaged to reduce errors introduced by noise in the system.

As referenced above, certain environments may render ineffective conventional centroiding techniques to determine the location of a celestial body in a captured scene. For example, partial overhead cover such as leaves, tree branches, and the like may obscure the sun making its location more difficult. In other cases, strong reflections such as off of buildings may cause a false positive identification of the sun.

Thus, determining the centroid of the sun may be subject to error introduced by a user or an environment, or false positive identifications. For example, conventional systems may utilize a blob-centroiding technique. However, clutter present in the captured scene can obfuscate the exact location of the sun, present false positive identifications of the sun, or otherwise introduce uncertainty in the computation where blobs of brightness (e.g., areas in a binary or black and white image that contain a number of pixels above a threshold) may or may not be attributable to the actual location of the sun in the captured image. One example is where a building that reflects the sun is also contained in the captured image along with the sun. As will be explained below, in accordance with various examples of the present disclosure, an alternate centroiding technique is provided that mitigates these and other issues.

Figure 5:
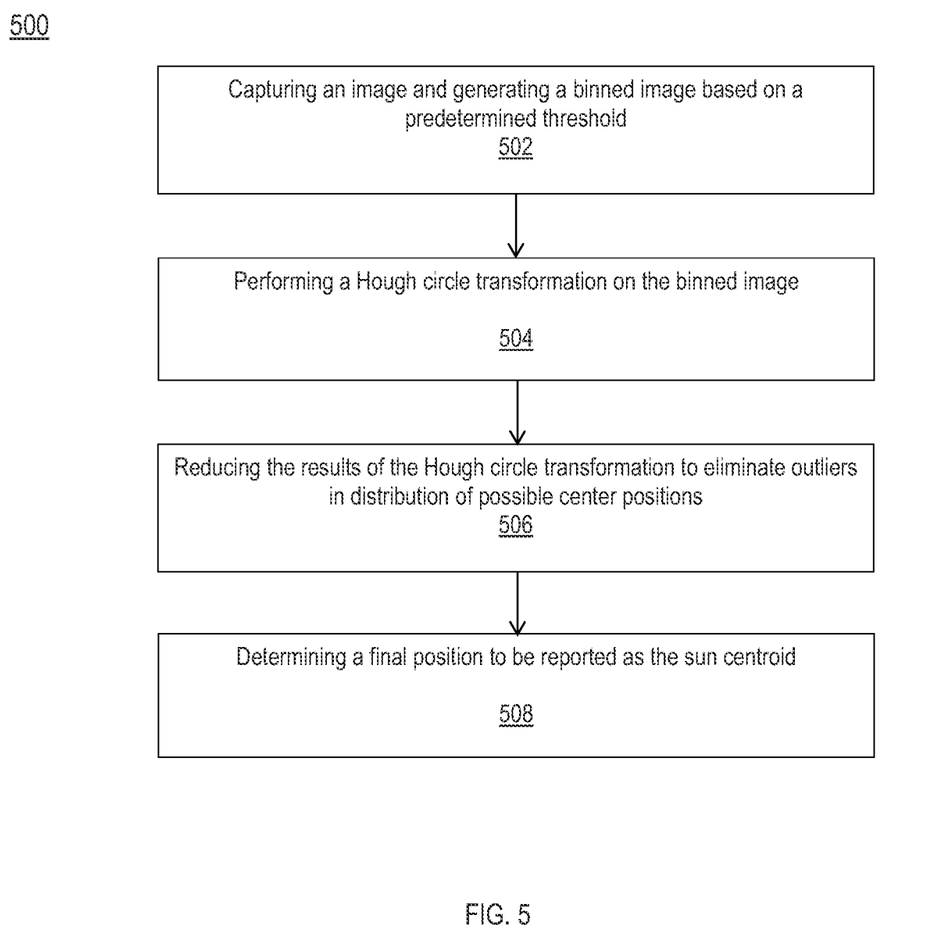
FIG. 5 shows a flow chart of a method for improved determination of the location of the center of the sun within an image in accordance with various examples.

In order to address these and other issues with conventional centroiding techniques, and in accordance with various examples, FIG. 5 shows a method 500 that leverages Hough circle transformations to generate a more accurate centroid for the sun while better rejecting clutter in the scene at the same time. The method 500 results in a reduction in inaccurate centroid positions where there are other bright regions in the captured scene (e.g., glint, very bright clouds, reflective buildings). Further, the method 500 provides improved centroid detection even when the sun is partially obscured by objects in the scene, such as overhanging branches, structures, and the like. That is, the method 500 results in reduced error and/or incidences of false positive identification of the sun.

The method 500 begins in block 502 with capturing an image, which includes the sun, and generating a binned image by setting a threshold so that pixels corresponding to a solar disc are set high while all others are set low (e.g., creating a binary or white (high) and black (low) image by forcing all bright pixels above a certain value to white and forcing the remaining pixels to black). This binning separates the portions of the scene that include the solar disc from those that contain only clutter, eliminating much of the clutter from further consideration or processing. The method 500 continues in block 504 with performing a Hough circle transformation on the binned image generated in block 502, with a radius search value set to be equivalent in pixels to the expected radial size of the solar disc. The result of the Hough circle transformation is a list of pixel positions and related metric values (or peaks) that correspond to the center of circles or arcs having radii equal to or approximately equal to the search radius. The value of each peak is determined by how close the radii of the corresponding identified circle, semi-circle, or arc in the binned image is to the search radius.

In block 506, the method 500 includes eliminating outliers in the distribution of possible center positions and continues in block 508 with determining the final position to be reported as the sun centroid. For example, the resulting list may be sorted by values of the correlation or peaks from greatest to smallest. The length of the list may be limited by removing peak values and corresponding pixel positions below a predetermined threshold value. Alternately, only a predetermined number of greatest peak values and corresponding pixel positions are retained. As a result, the center positions for the most likely center positions of the solar disc image are identified while further reducing error and false positive identifications. Thus, the method 500 first utilizes threshold binning to reduce the number of objects or clutter in the scene, which may be misinterpreted by the Hough circle transform as arcs of a circle. In particular, the Hough circle transform reports very strong peaks for circles or arcs of a certain radius, and by first eliminating darker portions of the scene, much of the extraneous clutter will not be considered by the Hough circle transform.

As explained above, the radius for the Hough circle transform corresponds to the expected size or range of sizes of the solar disc. This further filters out other features or clutter in the scene, which normally confuse existing sun finding algorithms. Finally, filtering the peaks reported by the Hough circle transform further eliminates false returns. In certain cases, an assumption is made that the solar disc radius is already known. However, if the initial Hough transform does not yield a sufficient number of matches, then a feedback loop may be implemented to iteratively refine the search radius if, for example, the solar disc radius will change due to clouds, haze, camera exposure, and other factors.

The above discussion is meant to be illustrative of the principles and various embodiments of the present disclosure. Numerous variations and modifications will become apparent to those skilled in the art once the above disclosure is fully appreciated. For example, although the housing for target location is generally described as including a digital display for viewing a target or other body, the digital display could be replaced by direct view optics such as an optical sight glass, or other viewing alternatives for sighting a target along a line of sight of the housing. It is intended that the following claims be interpreted to embrace all such variations and modifications.

What is claimed is:

1. An apparatus for target location, comprising:
    a portable housing comprising:
        a range sensor to generate range data;
        an image sensor to generate image data;
        an input port for receiving GPS location data of the housing location;
        an inertial sensor to generate inertia data; and
        a processor to:
            receive the image data from the image sensor and the housing location data from the input port via a user input device coupled to the input port, and determine a first orientation of the housing based on the image data and the housing location data; and
            after moving the portable housing, receive the inertia data from the inertial sensor and modify the first orientation of the housing based on the inertia data to produce a modified orientation solely of the housing and not of the target.

2. The apparatus of claim 1 wherein the processor receives the housing location data via manual entry of a latitude value and a longitude value of the housing upon the user input device coupled to the input port.

3. The apparatus of claim 1 wherein the range sensor comprises a laser rangefinder.

4. The apparatus of claim 1 wherein the inertial sensor comprises a MEMS gyroscope.

5. The apparatus of claim 1 wherein the image data comprises data indicative of at least one celestial body and when the processor determines the first orientation, the processor compares the image data to known parameters for the at least one celestial body at a given time of day and the location indicated by the housing location data to determine the first orientation.

6. The apparatus of claim 5 wherein the celestial body comprises at least one selected from the group consisting of: the sun, the moon, one star other than the sun, a grouping of stars other than the sun, and one or more planets.

7. The apparatus of claim 1 wherein the image data comprises data indicative of a body having a known location and when the processor determines the first orientation, the processor compares the location indicated by the housing location data and the known location of the body.

8. The apparatus of claim 1 wherein the processor is further configured to:
    receive the range data from the range sensor and housing location data; and
    determine the target location based on the modified orientation data, the range data, and the housing location data.

9. A method for target location using a portable housing, comprising:
    receiving image data from an image sensor in the housing and housing location data via a user input device, and determining a first orientation of the housing based on the image data and the housing location data; and
    receiving inertia data from an inertial sensor in the housing and modifying the first orientation of the housing based on the inertia data to produce a modified orientation solely of the housing and not of the target.

10. The method of claim 9 further comprising:
    receiving range data from a range sensor in the housing and housing location data; and
    determining the target location based on the modified orientation data, the range data, and the housing location data.

11. The method of claim 9 wherein the image data comprises data indicative of at least one celestial body and the method further comprises:
    comparing the image data to known parameters for the at least one celestial body at a given time of day and the location indicated by the housing location data to determine the first orientation.

12. The method of claim 11 wherein the celestial body comprises at least one selected from the group consisting of: the sun, the moon, one star other than the sun, a grouping of stars other than the sun, and one or more planets.

13. The method of claim 9 wherein the image data comprises data indicative of a body having a known location and the method further comprises determining the first orientation by comparing the location indicated by the housing location data and the known location of the body.

14. A non-transitory computer-readable medium comprising instructions that, when executed by a processor, cause the processor to:
receive image data from an image sensor and housing location data via a user input device, and determine a first orientation of a portable housing for the processor based on the image data and the housing location data; and
receive inertia data from an inertial sensor and modify the first orientation of the housing based on the inertia data to produce a modified orientation solely of the housing and not of the target.

15. The non-transitory computer-readable medium of claim 14 wherein the instructions further cause the processor to:
receive range data from a range sensor and housing location data; and
determine a location of a target based on the modified orientation data, the range data, and the housing location data.

16. The non-transitory computer-readable medium of claim 14 wherein the image data comprises data indicative of at least one celestial body and the instructions further cause the processor to:
compare the image data to known parameters for the at least one celestial body at a given time of day and the location indicated by the housing location data to determine the first orientation.

17. The non-transitory computer-readable medium of claim 16 wherein the celestial body comprises at least one selected from the group consisting of: the sun, the moon, one star other than the sun, a grouping of stars other than the sun, and one or more planets.

18. The non-transitory computer-readable medium of claim 14 wherein the image data comprises data indicative of a body having a known location and the instructions further cause the processor to determine the first orientation by comparing the location indicated by the housing location data and the known location of the body.

19. The apparatus of claim 2 wherein the user input device is selected from the group consisting of:
a keypad; and
a touchscreen.

20. The non-transitory computer-readable medium of claim 17 wherein, when the celestial body is the sun, the instructions causing the processor to receive image data from an image sensor and determine a first orientation of the portable housing are operable during day-night crossover.

* * * * *